(12) United States Patent
Garza et al.

(10) Patent No.: US 9,015,737 B2
(45) Date of Patent: Apr. 21, 2015

(54) LINKED ADVERTISEMENTS

(71) Applicant: Microsoft Corporation, Redmond, WA (US)

(72) Inventors: Enrique de la Garza, Sammamish, WA (US); Karin Zilberstein, Kirkland, WA (US); Joshua Lawrence Munsee, Bellevue, WA (US); Alexei Pineda, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 87 days.

(21) Appl. No.: 13/865,673

(22) Filed: Apr. 18, 2013

(65) Prior Publication Data

US 2014/0317646 A1    Oct. 23, 2014

(51) Int. Cl.
| | |
|---|---|
| H04N 7/16 | (2011.01) |
| H04H 60/33 | (2008.01) |
| H04H 60/56 | (2008.01) |
| H04N 7/10 | (2006.01) |
| H04N 7/025 | (2006.01) |
| H04N 21/442 | (2011.01) |
| H04N 21/435 | (2011.01) |
| H04N 21/81 | (2011.01) |

(52) U.S. Cl.
CPC ....... *H04N 21/44218* (2013.01); *H04N 21/435* (2013.01); *H04N 21/812* (2013.01)

(58) Field of Classification Search
None
See application file for complete search history.

(56) References Cited

U.S. PATENT DOCUMENTS

| | | |
|---|---|---|
| 5,771,307 A | 6/1998 | Lu et al. |
| 6,708,335 B1 | 3/2004 | Ozer et al. |
| 6,873,710 B1 | 3/2005 | Cohen-Solal |
| 7,103,904 B1 | 9/2006 | Blackketter et al. |
| 7,930,716 B2 | 4/2011 | Liga et al. |
| 8,296,151 B2 | 10/2012 | Klein et al. |
| 8,301,125 B2 | 10/2012 | Ramer et al. |
| 8,310,985 B2 | 11/2012 | Harb |
| 8,321,889 B2 | 11/2012 | Wong et al. |
| 8,386,304 B2 | 2/2013 | Chen et al. |

(Continued)

OTHER PUBLICATIONS

For Brands—www.glamadapt.com/forBrands.html, dated Mar. 12, 2013, 1 page.

(Continued)

*Primary Examiner* — Oschta Montoya
(74) *Attorney, Agent, or Firm* — Aaron Chatterjee; Doug Barker; Micky Minhas

(57) ABSTRACT

Embodiments of the present invention generate linked advertisements. Linked advertisements may include a preliminary advertisement and one or more subsequent advertisements. In one embodiment, the viewer is only shown the subsequent advertisement upon detecting a positive reaction to the preliminary advertisement. The subsequent advertisement is associated with presentation triggers that specify a context in which the subsequent advertisement should be presented. The context may be defined by a time of day, location, user activity, and/or other parameters. For example, the presentation trigger may specify a context in which the user is able to purchase an advertised good or service. For example, the context could be the user driving (activity context) near a coffee shop (location context) in the morning (time context). The reaction to the preliminary advertisement may be explicit or implicit.

16 Claims, 11 Drawing Sheets

(56) References Cited

U.S. PATENT DOCUMENTS

| | | | |
|---|---|---|---|
| 2003/0118974 A1* | 6/2003 | Obrador | 434/236 |
| 2005/0289582 A1* | 12/2005 | Tavares et al. | 725/10 |
| 2006/0293921 A1 | 12/2006 | McCarthy et al. | |
| 2007/0220108 A1 | 9/2007 | Whitaker | |
| 2008/0091512 A1 | 4/2008 | Marci et al. | |
| 2009/0025024 A1* | 1/2009 | Beser et al. | 725/12 |
| 2009/0195392 A1* | 8/2009 | Zalewski | 340/573.1 |
| 2009/0217315 A1 | 8/2009 | Malik | |
| 2010/0048300 A1 | 2/2010 | Capio | |
| 2010/0070987 A1* | 3/2010 | Amento et al. | 725/10 |
| 2010/0161425 A1 | 6/2010 | Sideman | |
| 2010/0211439 A1 | 8/2010 | Marci et al. | |
| 2010/0257052 A1 | 10/2010 | Zito et al. | |
| 2011/0029362 A1 | 2/2011 | Roeding et al. | |
| 2011/0145048 A1 | 6/2011 | Liu | |
| 2011/0154203 A1* | 6/2011 | Spencer et al. | 715/719 |
| 2011/0173655 A1 | 7/2011 | Blumenschein et al. | |
| 2011/0199386 A1 | 8/2011 | Dharwada et al. | |
| 2011/0214082 A1 | 9/2011 | Osterhout et al. | |
| 2011/0225043 A1 | 9/2011 | Bhatia et al. | |
| 2012/0072939 A1 | 3/2012 | Crenshaw | |
| 2012/0116867 A1 | 5/2012 | Reis et al. | |
| 2012/0123854 A1 | 5/2012 | Anderson et al. | |
| 2012/0143693 A1 | 6/2012 | Chung et al. | |
| 2012/0185905 A1 | 7/2012 | Kelley | |
| 2012/0233009 A1* | 9/2012 | Fougner et al. | 705/26.3 |
| 2012/0238350 A1* | 9/2012 | Sarig et al. | 463/25 |
| 2012/0265606 A1 | 10/2012 | Patnode | |
| 2012/0304206 A1* | 11/2012 | Roberts et al. | 725/12 |
| 2012/0326993 A1 | 12/2012 | Weisman | |
| 2012/0331494 A1 | 12/2012 | Pontual et al. | |
| 2013/0031584 A1 | 1/2013 | Chane et al. | |
| 2013/0080239 A1 | 3/2013 | Okerlund | |
| 2013/0102854 A1 | 4/2013 | Zheng et al. | |
| 2013/0152113 A1 | 6/2013 | Conrad et al. | |
| 2013/0189661 A1 | 7/2013 | el Kaliouby et al. | |
| 2013/0205314 A1* | 8/2013 | Ramaswamy et al. | 725/14 |
| 2013/0263182 A1* | 10/2013 | Ivy et al. | 725/34 |
| 2013/0318546 A1 | 11/2013 | Kothuri et al. | |

OTHER PUBLICATIONS

Non-Final Office Action dated May 23, 2014 in U.S. Appl. No. 13/892,686, 12 pages.
Non-Final Office Action dated Apr. 25, 2014 in U.S. Appl. No. 13/874,932, 14 pages.
Final Office Action dated Jul. 21, 2014 in U.S. Appl. No. 13/874,932, 13 pages.
Couceiro, et al., "Data Stream Processing on Real-time Mobile Advertisement", In 12th IEEE International Conference on Mobile Data Management, vol. 1, Jun. 6, 2011, 8 pages.
NPL: Parkhurst, Emily, "Microsoft's Future Software May Watch You, Track Your Emotions", Published May 4, 2012, http://www.bizjournals.com/seattle/blog/techflash/2012/05/microsoft-wants-to-watch-you-track.html?page=all, 3 pages.
NPL: Agarwal, et al., "Beyond Usability: Evaluating Emotional Response as an Integral Part of the User Experience", In Proceedings of the 27th International Conference on Human Factors in Computing Systems, Apr. 3, 2009, 12 pages.
NPL: "Emotion Response Analysis (ERA) Through Eeg", retrieved Mar. 12, 2013, http://www.simpleusability.com/services/eeg/, 3 pages.
NPL: "SXSW Accelerator 2013 Finalists", Retrieved on: Mar. 11, 2013, Available at: http://sxsw.com/interactive/startupvillage/accelerator/finalists, 14 pages.
International Search Report with Written Opinion dated Nov. 7, 2014 in PCT/US14/34437, 7 pages.
Final Office Action dated Nov. 5, 2014 in U.S. Appl. No. 13/874,932, 10 pages.
Non-Final Office Action dated Sep. 10, 2014 in U.S. Appl. No. 13/874,932, 10 pages.
Non-Final Office Action dated Oct. 23, 2014 U.S. Appl. No. 13/872,258, 16 pages.
International Search Report with Written Opinion Issued in PCT Patent Application No. PCT/US2014/37615, Mailed Date: Jan. 16, 2015, 9 pages.
International Search Report and Written Opinion Issued in PCT Patent Application No. PCT/US2014/036279, Mailed Date: Jan. 22, 2015, 11 pages.

* cited by examiner

LINKED ADVERTISEMENTS

BACKGROUND

Advertisements are shown before, during, and after media presentations. Advertisements are even included within media presentations through product placement. The advertisements shown with the media are selected based on anticipated audience demographics and interests of the anticipated audience. The advertisements are shown regardless of whether it is a good time for the audience member to act in response to the advertisement.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention generate linked advertisements. Linked advertisements may include a preliminary advertisement and one or more subsequent advertisements. In one embodiment, the viewer is only shown the subsequent advertisement upon detecting a positive reaction to the preliminary advertisement. The subsequent advertisement is associated with presentation triggers that specify a context in which the subsequent advertisement should be presented. The context may be defined by a time of day, location, user activity, and/or other parameters. For example, the presentation trigger may specify a context in which the user is able to purchase an advertised good or service. For example, the context could be the user driving (activity context) near a coffee shop (location context) in the morning (time context).

The preliminary advertisement and subsequent advertisement may be shown on different devices. For example, the preliminary advertisement may be shown on a television as part of a media presentation (e.g., a separate ad, product placement) and the subsequent advertisement could be shown on a mobile device, such as a smartphone or a tablet. Showing the subsequent advertisement on a location-aware (e.g., GPS enabled) mobile device allows the presentation trigger to include a location.

The reaction to the preliminary advertisement may be explicit or implicit. An explicit reaction could be the user making an affirmative gesture indicating that he likes the preliminary advertisement. The implicit reaction may be derived through an analysis of image data. The image data may be generated by a depth camera, video camera, or other imaging device. In one embodiment, the user's facial expressions are analyzed to determine a reaction to an advertised product or service. Apart from, or in combination with the facial expressions, biometric readings may be derived from the imaging data.

BRIEF DESCRIPTION OF THE DRAWINGS

Embodiments of the invention are described in detail below with reference to the attached drawing figures, wherein.

DETAILED DESCRIPTION

Figure 1:
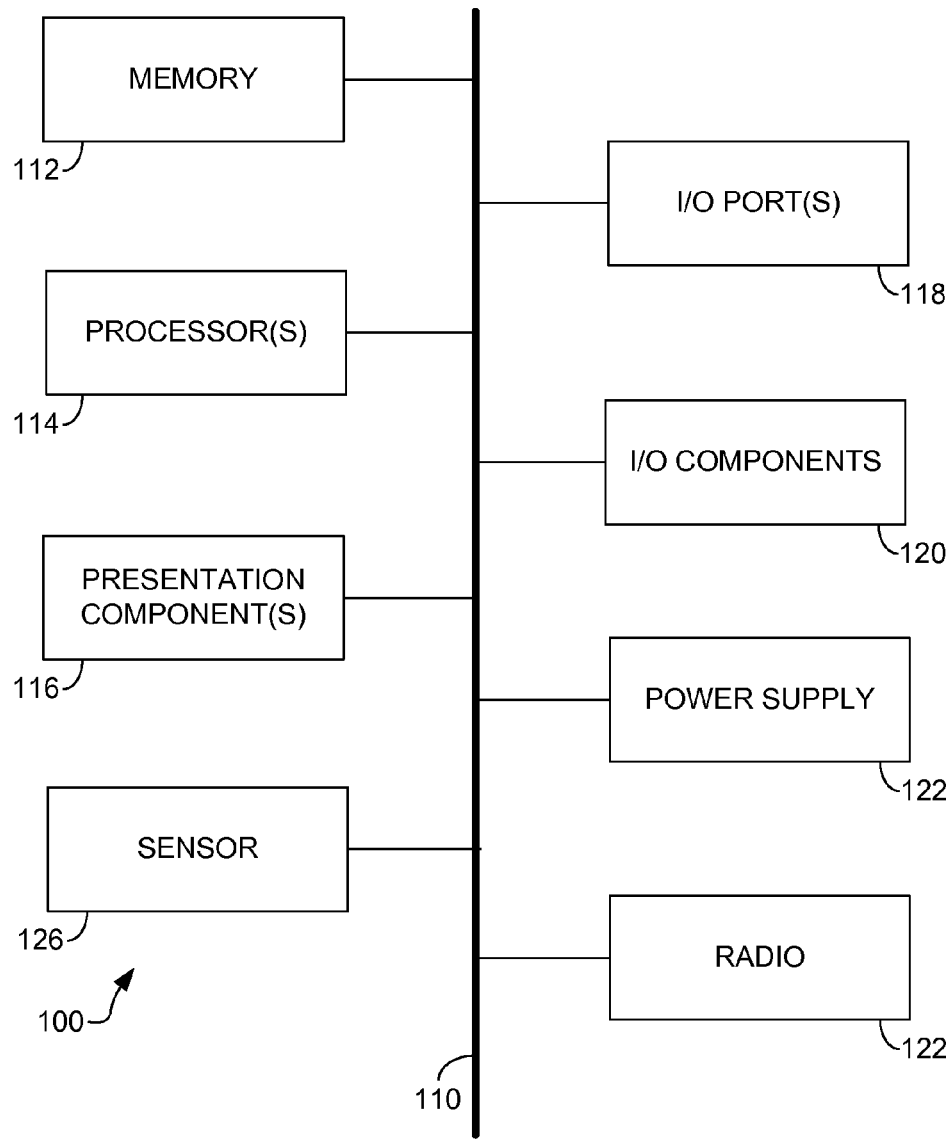
FIG. 1 is a block diagram of an exemplary computing environment suitable for implementing embodiments of the invention.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention generate linked advertisements. Linked advertisements may include a preliminary advertisement and one or more subsequent advertisements. The preliminary advertisement and subsequent advertisement may be separated by time, location, and device. The preliminary advertisement and subsequent advertisements display related products or services and may operate together as a unified ad campaign.

In one embodiment, the viewer is only shown the subsequent advertisement upon detecting a positive reaction to the preliminary advertisement. The subsequent advertisement is associated with presentation triggers that specify a context in which the subsequent advertisement should be presented. The context may be defined by a time of day, location, user activity, and/or other parameters. For example, the presentation trigger may specify a context in which the user is able to purchase an advertised good or service. For example, the context could be the user driving (activity context) near a coffee shop (location context) in the morning (time context).

The preliminary advertisement and subsequent advertisement may be shown on different devices. For example, the preliminary advertisement may be shown on a television as part of a media presentation (e.g., a separate ad, product placement) and the subsequent advertisement could be shown on a mobile device, such as a smartphone or a tablet. Showing the subsequent advertisement on a location-aware (e.g., GPS enabled) mobile device allows the presentation trigger to include a location. Other contextual parameters may include a time of day and the user's current activity. For example, the presentation trigger could specify that the subsequent advertisement is only shown during business hours for the retail outlet. In another example, the subsequent advertisement is only shown at a time when the user is likely to purchase a product or service. For example, a user may be likely to purchase food at a restaurant during lunch time or dinner time.

The reaction to the preliminary advertisement may be explicit or implicit. An explicit reaction could be the user making an affirmative gesture indicating that they like the preliminary advertisement. The user could also explicitly request more information or otherwise express an interest in the advertised product through a companion device, such as a smartphone or tablet. In one embodiment, a companion application is provided to allow the user to explicitly indicate he likes an advertised product or service. The subsequent advertisement may include a coupon or other incentive for the user to try the product or service. In this way, the user could be encouraged to express her interest in an advertised product or service through the companion application. For users that do not have a companion device, or do not want to use a companion application, an explicit indication of interest may be made through a gesture, game pad, keyboard, controller, or voice command picked up by an entertainment device facilitating the linked advertising. The entertainment device could be a television, game console, cable box, or other similar device that is able to receive input from the audience and correlate it with what content the display device shows.

In one embodiment, the user's reaction to an advertised product (e.g., a separate ad, product placement) or service is implicit. The implicit reaction may be derived through an analysis of image data. A depth camera, video camera, or other imaging device may generate the image data. In one embodiment, the user's facial expressions are analyzed to determine a reaction to an advertised product or service. Apart from, or in combination with, the facial expressions, biometric readings may be derived from the imaging data. For example, facial flushing and heart rate may be determined from the imaging data and used to classify the reaction as positive, negative, or indifferent. In one embodiment, the audience member's facial expressions and biometric changes are compared against a baseline for the audience member to determine whether the reaction is positive as well as a strength of the reaction.

The subsequent advertisements may be part of an advertising path that includes a series of advertisements with different presentation triggers, content, and incentives. In one embodiment, the strength of the user's reaction to the preliminary advertisement is used to activate different advertisements within the path. The presentation trigger for an active subsequent advertisement is monitored, whereas presentation triggers for inactive advertisements are not. Ads within the path may be activated and deactivated in response to additional user actions or rules.

In one embodiment, a strong positive reaction to the preliminary ad activates a subsequent advertisement having a comparatively lower incentive. For example, the subsequent advertisement may include a 50 cent discount on a sandwich. A mild or weekly positive reaction to the preliminary advertisement may activate a subsequent advertisement having a higher incentive. For example, the subsequent advertisement could have a two dollar discount on a sandwich.

The user's prior purchase history may also be used to determine which ad(s) in an ad path to active. For example, if a user repeatedly ignores an advertisement with a lower incentive, he may be moved to an advertisement with a higher incentive. Similarly, if a user gives a strong positive response to a preliminary advertisement, but is known to regularly purchase products associated with the advertisement, he may be associated with a subsequent advertisement having a lower incentive. Alternatively, the user could be associated with a subsequent advertisement that reminds the user of a consumer club he is in, such as a sandwich club. This subsequent advertisement could remind the user that he needs to purchase two more sandwiches before he earns a free sandwich.

Embodiments of the present invention use audience data to select an appropriate ad path from one of several ad paths available. The audience data may be derived from image data generated by an imaging device, such as a video camera, that has a view of the audience area. Automated image analysis may be used to generate useful audience data that is used to select the overlay.

The audience data derived from the image data includes number of people present in the audience, engagement level of people in the audience, personal characteristics of those individuals, and response to the media content. Different levels of engagement may be assigned to audience members. Image data may be analyzed to determine how many people are present in the audience and characteristics of those people.

Audience data includes a level of engagement or attentiveness. A person's attentiveness may be classified into one or more categories or levels. The categories may range from not paying attention to full attention. A person that is not looking at the television and is in a conversation with somebody else, either in the room or on the phone, may be classified as not paying attention or fully distracted. On the other hand, somebody in the room that is not looking at the TV, but is not otherwise obviously distracted, may have a medium level of attentiveness. Someone that is looking directly at the television without an apparent distraction may be classified as fully attentive. A machine-learning image classifier may assign the levels of attentiveness by analyzing image data.

Audience data may include a person's reaction to a media content, such as a preliminary advertisement. The person's reaction may be measured by studying biometrics gleaned from the imaging data. For example, heartbeat and facial flushing may be detected in the image data. Similarly, pupil dilation and other facial expressions may be associated with different reactions. All of these biometric characteristics may be interpreted by a classifier to determine whether the person likes or dislikes a media content.

The different audience data may be used to determine when reaction criteria associated with a preliminary advertisement are satisfied. For example, a criterion may not be satisfied when a person is present but shows a low level of attentiveness. An advertiser may specify that an ad path is activated only when one or more of the individuals present are fully attentive.

A person's reaction to a primary ad or other media content may be used to determine whether a subsequent ad is activated. For example, a person classified as having a negative reaction to a product placement within a movie may not be associated with an ad path for the product advertised through product placement. Alternatively, a person that responds positively to a primary ad may be associated with an ad path for a related product or service.

In addition to determining whether to activate an ad path based on engagement levels, personal characteristics of audience members may also be considered when selecting an ad path. The personal characteristics of the audience members include demographic data that may be discerned from image classification or from associating the person with a known personal account. For example, an entertainment company may require that the person submit a name, age, address, and other demographic information to maintain a personal account. The personal account may be associated with a facial recognition program that is used to authenticate the person. Regardless of whether the entertainment company is providing the primary ad, the facial recognition record associated with the personal account could be used to identify the person in the audience associated with the account. In some situations, all of the audience members may be associated with an account that allows precise demographic information to be associated with each audience member. Account information may be used to associate multiple devices with an audience member.

Having briefly described an overview of embodiments of the invention, an exemplary operating environment suitable for use in implementing embodiments of the invention is described below.

Exemplary Operating Environment

Referring to the drawings in general, and initially to FIG. 1 in particular, an exemplary operating environment for implementing embodiments of the invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Embodiments of the invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component 120. Also, processors have memory. The inventors hereof recognize that such is the nature of the art, and reiterate that the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory 112 may be removable, nonremovable, or a combination thereof. Exemplary memory includes solid-state memory, hard drives, optical-disc drives, etc. Computing device 100 includes one or more processors 114 that read data from various entities such as bus 110, memory 112 or I/O components 120. Presentation component(s) 116 present data indications to a person or other device. Exemplary presentation components 116 include a display device, speaker, printing component, vibrating component, etc. I/O ports 118 allow computing device 100 to be logically coupled to other devices including I/O components 120, some of which may be built in. Illustrative I/O components 120 include a microphone, joystick, game pad, satellite dish, scanner, printer, wireless device, etc.

Exemplary Entertainment Environment

Figure 2:
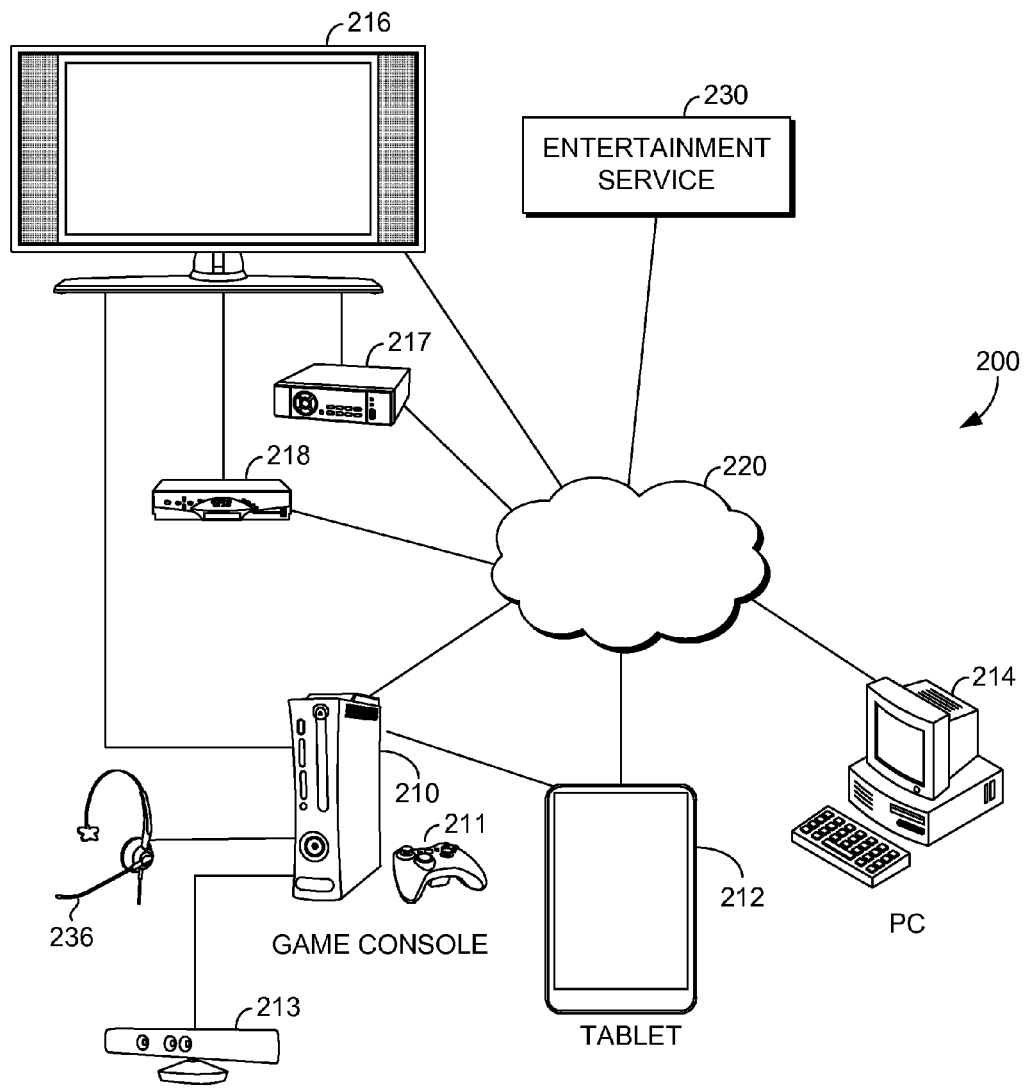
FIG. 2 is a diagram of an online entertainment environment, in accordance with an embodiment of the present invention.

Turning now to FIG. 2, an online entertainment environment 200 is shown, in accordance with an embodiment of the present invention. The online entertainment environment 200 comprises various entertainment devices connected through a network 220 to an entertainment service 230. Exemplary entertainment devices include a game console 210, a tablet 212, a personal computer 214, a digital video recorder 217, a cable box 218, and a television 216. Use of other entertainment devices not depicted in FIG. 2, such as smart phones, is also possible.

The game console 210 may have one or more game controllers communicatively coupled to it. In one embodiment, the tablet 212 may act as an input device for the game console 210 or the personal computer 214. In another embodiment, the tablet 212 is a stand-alone entertainment device. Network 220 may be a wide area network, such as the Internet. As can be seen, most devices shown in FIG. 2 could be directly connected to the network 220. The devices shown in FIG. 2, are able to communicate with each other through the network 220 and/or directly as indicated by the lines connecting the devices.

The controllers associated with game console 210 include a game pad 211, a headset 236, an imaging device 213, and a tablet 212. Tablet 212 is shown coupled directly to the game console 210, but the connection could be indirect through the Internet or a subnet. In one embodiment, the entertainment service 230 helps make a connection between the tablet 212 and the game console 210. The tablet 212 is capable of generating numerous input streams and may also serve as a display output mechanism. In addition to being a primary display, the tablet 212 could provide supplemental information related to primary information shown on a primary display, such as television 216. The input streams generated by the tablet 212 include video and picture data, audio data, movement data, touch screen data, and keyboard input data.

The headset 236 captures audio input from a player and the player's surroundings and may also act as an output device, if it is coupled with a headphone or other speaker. The headset 236 may facilitate voice control of the game console or other entertainment devices. A microphone (not shown) may be integrated into or connected to any of the entertainment devices to facilitate voice control.

The imaging device 213 is coupled to game console 210. The imaging device 213 may be a video camera, a still camera, a depth camera, or a video camera capable of taking still or streaming images. In one embodiment, the imaging device 213 includes an infrared light and an infrared camera. The imaging device 213 may also include a microphone, speaker, and other sensors. In one embodiment, the imaging device 213 is a depth camera that generates three-dimensional image data. The three-dimensional image data may be a point cloud or depth cloud. The three-dimensional image data may associate individual pixels with both depth data and color data. For example, a pixel within the depth cloud may include red, green, and blue color data, and X, Y, and Z coordinates. Stereoscopic depth cameras are also possible. The imaging device 213 may have several image-gathering components. For example, the imaging device 213 may have multiple cameras. In other embodiments, the imaging device 213 may have multidirectional functionality. In this way, the imaging device 213 may be able to expand or narrow a viewing range or shift its viewing range from side to side and up and down.

The game console 210 may have image-processing functionality that is capable of identifying objects within the depth cloud. For example, individual people may be identified along with characteristics of the individual people. In one embodiment, gestures made by the individual people may be distinguished and used to control games or media output by the game console 210. The game console 210 may use the image data, including depth cloud data, for facial recognition purposes to specifically identify individuals within an audience area. The facial recognition function may associate individuals with an account associated with a gaming service or media service, or used for login security purposes, to specifically identify the individual.

In one embodiment, the game console 210 uses microphone, and/or image data captured through imaging device 213 to identify content being displayed through television 216. For example, a microphone may pick up the audio data of a movie being generated by the cable box 218 and displayed on television 216. The audio data may be compared with a database of known audio data and the data identified using automatic content recognition techniques, for example. Content being displayed through the tablet 212 or the PC 214 may be identified in a similar manner. In this way, the game console 210 is able to determine what is presently being displayed to a person regardless of whether the game console 210 is the device generating and/or distributing the content for display.

The game console 210 may include classification programs that analyze image and/or data to generate audience data. For example, the game console 210 may determine number of people in the audience, audience member characteristics, levels of engagement, and audience response. Audio data may be compared with a content data base do identify content being displayed. The audio data may be captured by a microphone coupled to the game console 210. In this way, the content displayed may be identified when it is output by an entertainment device other than the game console 210. Content output by the game console 210 could also be identified using the audio signals.

In another embodiment, the game console 210 includes a local storage component. The local storage component may store user profiles for individual persons or groups of persons viewing and/or reacting to media content. Each user profile may be stored as a separate file, such as a cookie. The information stored in the user profiles may be updated automatically. Personal information, viewing histories, viewing selections, personal preferences, the number of times a person has viewed known media content, the portions of known media content the person has viewed, a person's responses to known media content, and a person's engagement levels in known media content may be stored in a user profile associated with a person. As described elsewhere, the person may be first identified before information is stored in a user profile associated with the person. In other embodiments, a person's characteristics may be first recognized and mapped to an existing user profile for a person with similar or the same characteristics. Demographic information may also be stored. Each item of information may be stored as a "viewing record" associated with a particular type of media content. As well, viewer personas, as described below, may be stored in a user profile.

Entertainment service 230 may comprise multiple computing devices communicatively coupled to each other. In one embodiment, the entertainment service is implemented using one or more server farms. The server farms may be spread out across various geographic regions including cities throughout the world. In this scenario, the entertainment devices may connect to the closest server farms. Embodiments of the present invention are not limited to this setup. The entertainment service 230 may provide primary content and secondary content. Primary content may include television shows, movies, and video games. Secondary content may include advertisements, social content, directors' information and the like.

FIG. 2 also includes a cable box 218 and a DVR 217. Both of these devices are capable of receiving content through network 220. The content may be on-demand or broadcast as through a cable distribution network. Both the cable box 218 and DVR 217 have a direct connection with television 216. Both devices are capable of outputting content to the television 216 without passing through game console 210, but in one embodiment the cable box 218 and DVR 217 pass through the game console 210. As can be seen, game console 210 also has a direct connection to television 216. Television 216 may be a smart television that is capable of receiving entertainment content directly from entertainment service 230. As mentioned, the game console 210 may perform audio analysis to determine what media title is being output by the television 216 when the title originates with the cable box 218, DVR 217, or television 216.

Exemplary Advertising and Content Service

Figure 3:
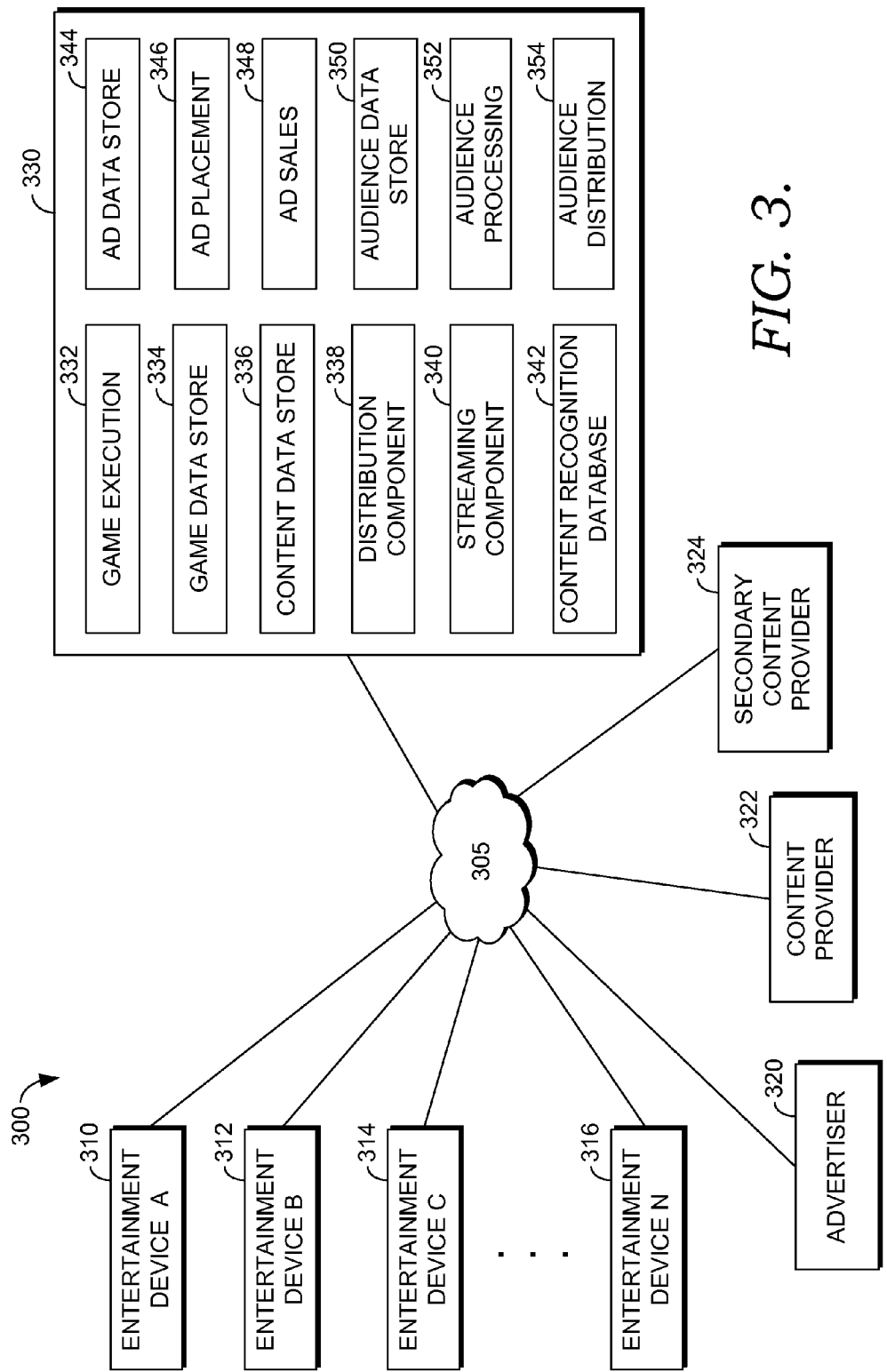
FIG. 3 is a diagram of a remote entertainment computing environment, in accordance with an embodiment of the present invention.

Turning now to FIG. 3, a distributed entertainment environment 300 is shown, in accordance with an embodiment of the present invention. The entertainment environment 300 includes entertainment device A 310, entertainment device B 312, entertainment device C 314, and entertainment device N 316 (hereafter entertainment devices 310-316). Entertainment device N 316 is intended to represent that there could be an almost unlimited number of clients connected to network 305. The entertainment devices 310-316 may take different forms. For example, the entertainment devices 310-316 may be game consoles, televisions, DVRs, cable boxes, personal computers, tablets, or other entertainment devices capable of outputting media. In addition, the entertainment devices 310-316 are capable of gathering viewer data through an imaging device, similar to imaging device 213 of FIG. 2 that was previously described. The imaging device could be built into a client, such as a web cam and microphone, or could be a stand-alone device.

In one embodiment, the entertainment devices 310-316 include a local storage component configured to store personal profiles for one or more persons. The local storage component is described in greater detail above with reference to the game console 210. The entertainment devices 310-316 may include classification programs that analyze image data to generate audience data. For example, the entertainment devices 310-316 may determine how many people are in the audience, audience member characteristics, levels of engagement, and audience response.

Network 305 is a wide area network, such as the Internet. Network 305 is connected to advertiser 320, content provider 322, and secondary content provider 324. The advertiser 320 distributes advertisements to entertainment devices 310-316. The advertiser 320 may also cooperate with entertainment service 330 to provide advertisements. The content provider 322 provides primary content such as movies, video games, and television shows. The primary content may be provided directly to entertainment devices 310-316 or indirectly through entertainment service 330.

Secondary content provider 324 provides content that compliments the primary content. Secondary content may be a director's cut, information about a character, game help information, and other content that compliments the primary content. The same entity may generate both primary content and secondary content. For example, a television show may be generated by a director that also generates additional secondary content to compliment the television show. The secondary content and primary content may be purchased separately and could be displayed on different devices. For example, the primary content could be displayed through a television while the secondary content is viewed on a companion device, such as a tablet. The advertiser 320, content provider 322, and secondary content provider 324 may stream content directly to entertainment devices or seek to have their content distributed by a service, such as entertainment service 330.

Entertainment service 330 provides content and advertisements to entertainment devices. The entertainment service 330 is shown as a single block. In reality, the functions should be widely distributed across multiple devices. In embodiments of the present invention, the various features of entertainment service 330 described herein may be provided by multiple entities and components. The entertainment service 330 comprises a game execution environment 332, a game data store 334, a content data store 336, a distribution component 338, a streaming component 340, a content recognition database 342, an ad data store 344, an ad placement component 346, an ad sales component 348, an audience data store 350, an audience processing component 352, and an audience distribution component 354. As can be seen, the various components may work together to provide content, including games, advertisements, and media titles to a client, and capture audience data. The audience data may be used to specifically target advertisements and/or content to a person. The audience data may also be aggregated and shared with or sold to others.

The game execution environment 332 provides an online gaming experience to a client device. The game execution environment 332 comprises the gaming resources required to execute a game. The game execution environment 332 comprises active memory along with computing and video processing. The game execution environment 332 receives gaming controls, such as controller input, through an I/O channel and causes the game to be manipulated and progressed according to its programming. In one embodiment, the game execution environment 332 outputs a rendered video stream that is communicated to the game device. Game progress may be saved online and associated with an individual person that has an ID through a gaming service. The game ID may be associated with a facial pattern.

The game data store 334 stores game code for various game titles. The game execution environment 332 may retrieve a game title and execute it to provide a gaming experience. Alternatively, the content distribution component 338 may download a game title to an entertainment device, such as entertainment device A 310.

The content data store 336 stores media titles, such as songs, videos, television shows, and other content. The distribution component 338 may communicate this content from content data store 336 to the entertainment devices 310-316. Once downloaded, an entertainment device may play the content on or output the content from the entertainment device. Alternatively, the streaming component 340 may use content from content data store 336 to stream the content to the person.

The content recognition database 342 includes a collection of audio clips associated with known media titles that may be compared to audio input received at the entertainment service 330. As described above, the received audio input (e.g., received from the game console 210 of FIG. 2) is mapped to the library of known media titles. Upon mapping the audio input to a known media title, the source of the audio input (i.e., the identity of media content) may be determined. The identified media title/content is then communicated back to the entertainment device (e.g., the game console) for further processing. Exemplary processing may include associating the identified media content with a person that viewed or is actively viewing the media content and storing the association as a viewing record.

The entertainment service 330 also provides advertisements. Advertisements available for distribution may be stored within ad data store 344. The advertisements may be presented as an overlay in conjunction with primary content and may be partial or full-screen advertisements that are presented between segments of a media presentation or between the beginning and end of a media presentation, such as a television commercial. The advertisements may be associated with audio content. Additionally, the advertisements may take the form of secondary content that is displayed on a companion device in conjunction with a display of primary content. The advertisements may also be presented when a person associated with a targeted persona is located in the audience area and/or is logged in to the entertainment service 330, as further described below.

The ad placement component 346 determines when an advertisement should be displayed to a person and/or what advertisement should be displayed. The ad placement component 346 may consume real-time audience data and automatically place an advertisement associated with a highest-bidding advertiser in front of one or more viewers because the audience data indicates that the advertiser's bidding criteria is satisfied. For example, an advertiser may wish to display an advertisement to men present in Kansas City, Mo. When the audience data indicates that one or more men in Kansas City are viewing primary content, an ad could be served with that primary content. The ad may be inserted into streaming content or downloaded to the various entertainment devices along with triggering mechanisms or instructions on when the advertisement should be displayed to the person. The triggering mechanisms may specify desired audience data that triggers display of the ad.

The ad placement component 346 may manage linked advertisements. The ad placement component 346 may communicate preliminary advertisements and subsequent advertisements to entertainment clients. For example, the ad placement component 346 could communicate a preliminary advertisement and associated response criteria to a smart TV. The smart TV could indicate that an audience member satisfied the response criteria. In response, the ad placement component 346 could communicate subsequent advertisements to the audience member's tablet along with presentation trigger. The ad placement component 346 could activate and deactivate subsequent advertisements as view responses to the advertisements are received. Further, viewers' response to ads in an ad path may tracked by the ad placement component 346. The ad placement component 346 may maintain a record of viewer responses and purchases. The ad placement component 346 may bill advertisers using the viewer response data.

The ad sales component 348 interacts with advertisers 320 to set a price for displaying an advertisement. In one embodiment, an auction is conducted for various advertising space. The auction may be a real-time auction in which the highest bidder is selected when a viewer or viewing opportunity satisfies the advertiser's criteria.

The audience data store 350 aggregates and stores audience data received from entertainment devices 310-316. The audience data may first be parsed according to known types or titles of media content. Each item of audience data that relates to a known type or title of media content is a viewing record for that media content. Viewing records for each type of media content may be aggregated, thereby generating viewing data. The viewing data may be summarized according to categories. Exemplary categories include a total number of persons that watched the content, the average number of persons per household that watched the content, a number of times certain persons watched the content, a determined response of people toward the content, a level of engagement of people in the media title, a length of time individuals watched the content, the common distractions that were ignored or engaged in while the content was being displayed, and the like. The viewing data may similarly be summarized according to types of persons that watched the known media content. For example, personal characteristics of the persons, demographic information about the persons, and the like may be summarized within the viewing data.

The audience processing component 352 may build and assign personas using the audience data and a machine-learning algorithm. A persona is an abstraction of a person or groups of people that describes preferences or characteristics about the person or groups of people. The personas may be based on media content the persons have viewed or listened to, as well as other personal information stored in a user profile on the entertainment device (e.g., game console) and associated with the person. For example, the persona could define a person as a female between the ages of 20 and 35 having an interest in science fiction, movies, and sports. Similarly, a person that always has a positive emotional response to car commercials may be assigned a persona of "car enthusiast." More than one persona may be assigned to an individual or group of individuals. For example, a family of five may have a group persona of "animated film enthusiasts" and "football enthusiasts." Within the family, a child may be assigned a persona of "likes video games," while the child's mother may be assigned a person of "dislikes video games." It will be understood that the examples provided herein are merely exemplary. Any number or type of personas may be assigned to a person.

The audience distribution component 354 may distribute audience data to content providers, advertisers, or other interested parties. For example, the audience distribution component 354 could provide information indicating that 300,000 discrete individuals viewed a television show in a geographic region. The audience data could be derived from image data received at each entertainment device. In addition to the number of people that viewed the media content, more granular information could be provided. For example, the total persons giving full attention to the content could be provided. In addition, response data for people could be provided. To protect the identity of individual persons, only a persona assigned to a person may be exposed and distributed to advertisers. A value may be placed on the distribution, as a condition on its delivery, as described above. The value may also be based on the amount, type, and dearth of viewing data delivered to an advertiser or content publisher.

Figure 4:
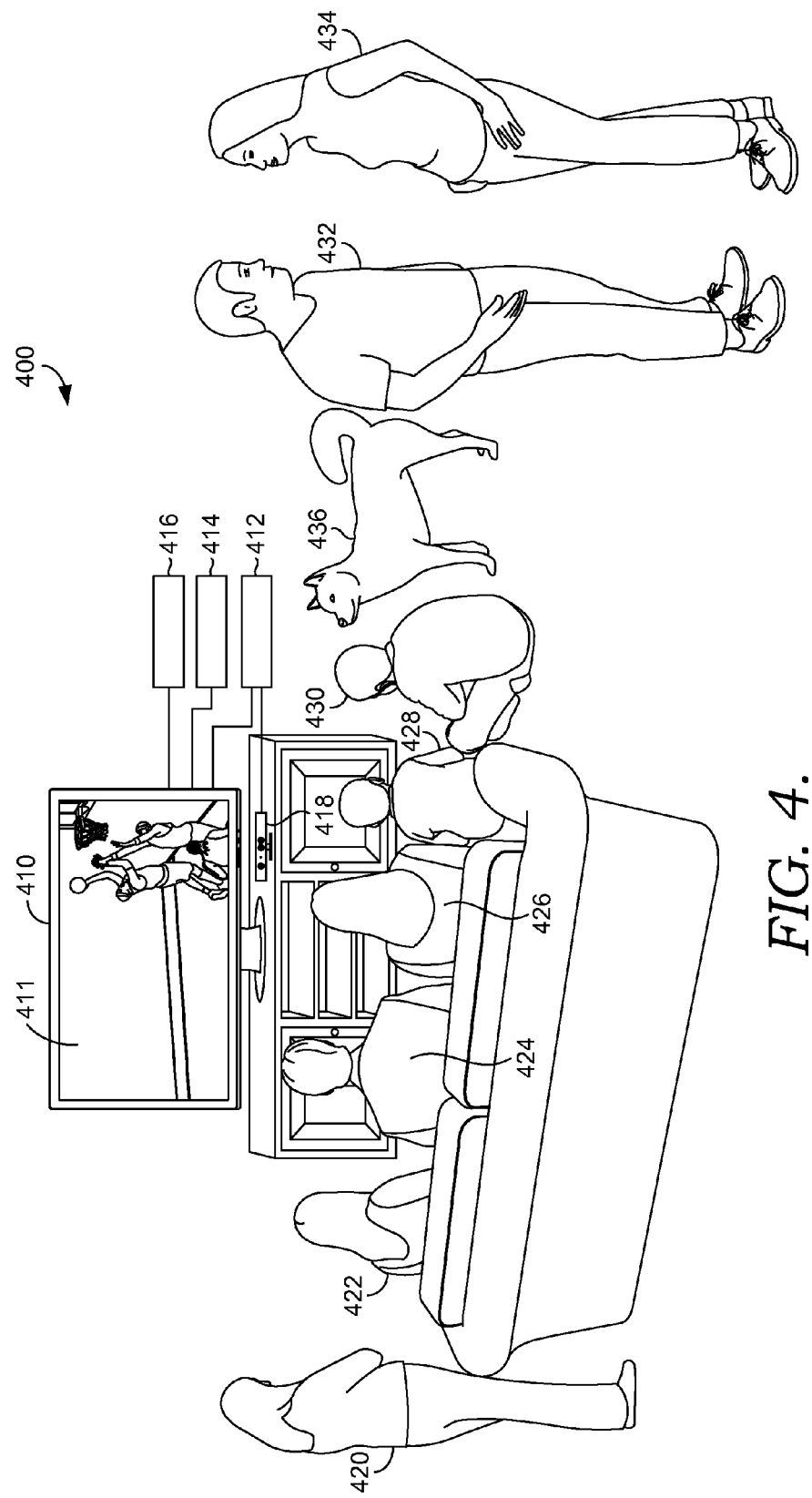
FIG. 4 is a diagram of an exemplary audience area captured using a depth camera, in accordance with an embodiment of the present invention.

Turning now to FIG. 4, an audience area 400 that includes a group of people is shown, in accordance with an embodiment of the present invention. The audience area is the area in front of the display device 410. In one embodiment, the audience area 400 comprises the area from which a person can see the content. In another embodiment, the audience area 400 comprises the area within a viewing range of the imaging device 418. In most embodiments, however, the viewing range of the imaging device 418 overlaps with the area from which a person can see content on the display device 410. If the content is only audio content, then the audience area is the area where the person may hear the content.

Content is provided to the audience area by an entertainment system that comprises a display device 410, a game console 412, a cable box 414, a DVD player 416, and an imaging device 418. The game console 412 may be similar to game console 210 of FIG. 2 described previously. The cable box 414 and the DVD player 416 may stream content from an entertainment service, such as entertainment service 330 of FIG. 3, to the display device 410 (e.g., television). The game console 412, cable box 414, and the DVD player 416 are all coupled to the display device 410. These devices may communicate content to the display device 410 via a wired or wireless connection, and the display device 410 may display the content. In some embodiments, the content shown on the display device 410 may be selected by one or more persons within the audience. For example, a person in the audience may select content by inserting a DVD into the DVD player 416 or select content by clicking, tapping, gesturing, or pushing a button on a companion device (e.g., a tablet) or a remote in communication with the display device 410. Content selected for viewing may be tracked and stored on the game console 412.

The imaging device 418 is connected to the game console 412. The imaging device 418 may be similar to imaging device 213 of FIG. 2 described previously. The imaging device 418 captures image data of the audience area 400. Other devices that include imaging technology, such as the tablet 212 of FIG. 2, may also capture image data and communicate the image data to the game console 412 via a wireless or wired connection.

In one embodiment, audience data may be gathered through image processing. Audience data may include a detected number of persons within the audience area 400. Persons may be detected based on their form, appendages, height, facial features, movement, speed of movement, associations with other persons, biometric indicators, and the like. Once detected, the persons may be counted and tracked so as to prevent double counting. The number of persons within the audience area 400 also may be automatically updated as people leave and enter the audience area 400.

Audience data may similarly include a direction each audience member is facing. Determining the direction persons are facing may, in some embodiments, be based on whether certain facial or body features are moving or detectable. For example, when certain features, such as a person's cheeks, chin, mouth and hairline are detected, they may indicate that a person is facing the display device 410. Audience data may include a number of persons that are looking toward the display device 410, periodically glancing at the display device 410, or not looking at all toward the display device 410. In some embodiments, a period of time each person views specific media presentations may also comprise audience data.

As an example, audience data may indicate that an individual 420 is standing in the background of the audience area 400 while looking at the display device 410. Individuals 422, 424, 426, and child 428 and child 430 may also be detected and determined to be all facing the display device 410. A man 432 and a woman 434 may be detected and determined to be looking away from the television. The dog 436 may also be detected, but characteristics (e.g., short stature, four legs, and long snout) about the dog 436 may not be stored as audience data because they indicate that the dog 436 is not a person.

Additionally, audience data may include an identity of each person within the audience area 400. Facial recognition technologies may be utilized to identify a person within the audience area 400 or to create and store a new identity for a person. Additional characteristics of the person (e.g., form, height, weight) may similarly be analyzed to identify a person. In one embodiment, the person's determined characteristics may be compared to characteristics of a person stored in a user profile on the display device 410. If the determined characteristics match those in a stored user profile, the person may be identified as a person associated with the user profile.

Audience data may include personal information associated with each person in the audience area. Exemplary personal characteristics include an estimated age, a race, a nationality, a gender, a height, a weight, a disability, a medical condition, a likely activity level of (e.g., active or relatively inactive), a role within a family (e.g., father or daughter), and the like. For example, based on the image data, an image processor may determine that audience member 420 is a woman of average weight. Similarly, analyzing the width, height, bone structure, and size of individual 432 may lead to a determination that the individual 432 is a male. Personal information may also be derived from stored user profile information. Such personal information may include an address, a name, an age, a birth date, an income, one or more viewing preferences (e.g., movies, games, and reality television shows) of or login credentials for each person. In this way, audience data may be generated based on both processed image data and stored personal profile data. For example, if individual 434 is identified and associated with a personal profile of a 13-year-old, processed image data that classifies individual 434 as an adult (i.e., over 18 years old) may be disregarded as inaccurate.

The audience data also comprises an identification of the primary content being displayed when image data is captured at the imaging device 418. The primary content may, in one embodiment, be identified because it is fed through the game console 412. In other embodiments, and as described above, audio output associated with the display device 410 may be received at a microphone associated with the game console 412. The audio output is then compared to a library of known content and determined to correspond to a known media title or a known genre of media title (e.g., sports, music, movies, and the like). As well, other cues (e.g., whether the person appears to be listening to as opposed to watching a media presentation) may be analyzed to determine the identity of the media content (e.g., a song as opposed to the soundtrack to a movie). Thus, audience data may indicate that basketball game 411 was being displayed to individuals 420, 422, 424, 426, 428, 430, 432, and 434 when images of the individuals were captured. The audience data may also include a mapping of the image data to the exact segment of the media presentation (e.g., basketball game 411) being displayed when the image data was captured.

Figure 5:
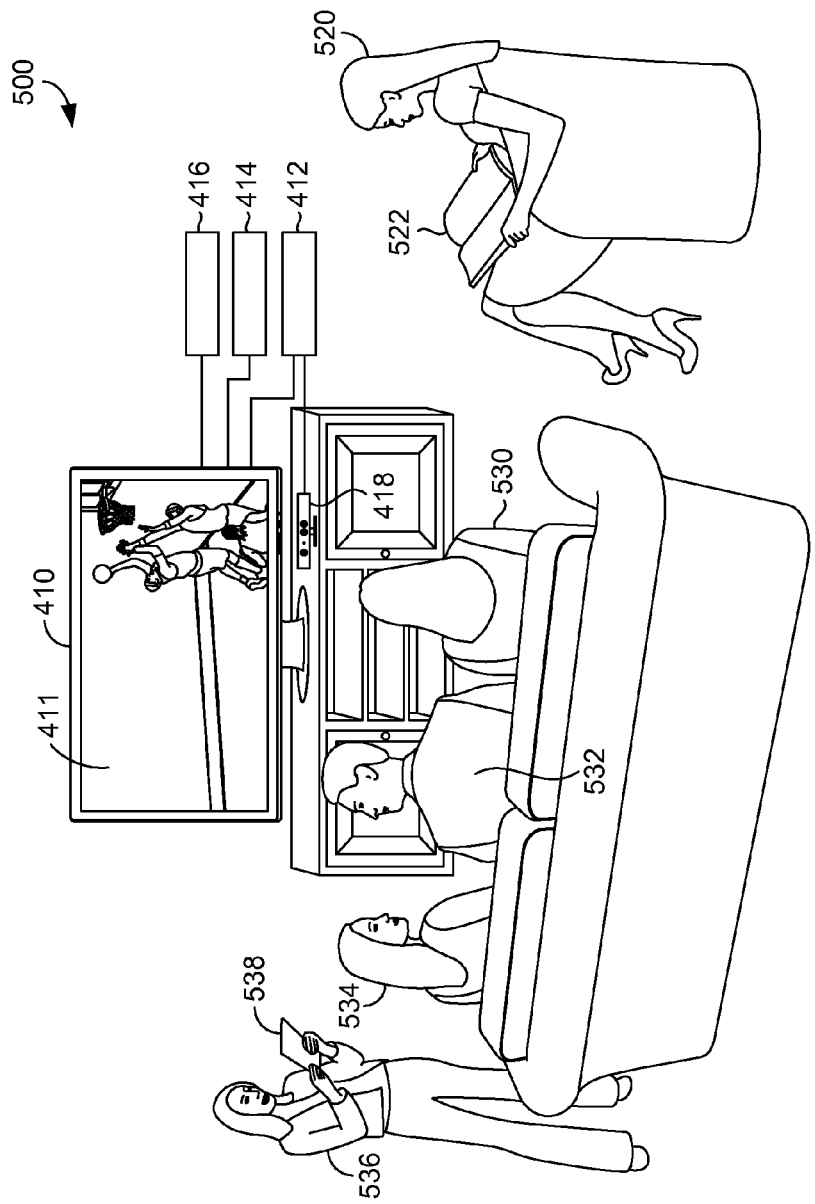
FIG. 5 is a diagram of an exemplary audience area captured using a depth camera, in accordance with an embodiment of the present invention.

Turning now to FIG. 5, an audience area depicting audience members' levels of engagement is shown, in accordance with an embodiment of the present invention. The entertainment system is identical to that shown in FIG. 4, but the audience members have changed. Image data captured at the imaging device 418 may be processed similarly to how it was processed with reference to FIG. 4. However, in this illustrative embodiment, the image data may be processed to generate audience data that indicates a level of engagement of and/or attention paid by the audience toward the media presentation (e.g., the basketball game 411).

An indication of the level of engagement of a person may be generated based on detected traits of or actions taken by the person, such as facial features, body positioning, and body movement. For example, the movement of a person's eyes, the direction the person's body is facing, the direction the person's face is turned, whether the person is engaged in another task (e.g., talking on the phone), whether the person is talking, the number of additional persons within the audience area 500, and the movement of the person (e.g., pacing, standing still, sitting, or lying down) are traits of and/or actions taken by a person that may be distilled from the image data. The determined traits may then be mapped to predetermined categories or levels of engagement (e.g., a high level of engagement or a low level of engagement). Any number of categories or levels of engagement may be created, and the examples provided herein are merely exemplary.

In another embodiment, a level of engagement may additionally be associated with one or more predetermined categories of distractions. In this way, traits of or actions taken by a person may be mapped to both a level of engagement and a type of distraction. Exemplary actions that indicate a distraction include engaging in conversation, using more than one display device (e.g., the display device 510 and a companion device), reading a book, playing a board game, falling asleep, getting a snack, leaving the audience area 500, walking around, and the like. Exemplary distraction categories may include "interacted with other persons," "interacted with an animal," "interacted with other display devices," "took a brief break," and the like.

Other input that may be used to determine a person's level of engagement is audio data. Microphones associated with the game console 412 may pick up conversations or sounds from the audience. The audio data may be interpreted and determined to be responsive to (i.e., related to or directed at) the media presentation or nonresponsive to the media presentation. The audio data may be associated with a specific person (e.g., a person's voice). As well, signal data from companion devices may be collected to generate audience data. The signal data may indicate, in greater detail than the image data, a type or identity of a distraction, as described below.

Thus, the image data gathered through imaging device 418 may be analyzed to determine that individual 520 is reading a paper 522 and is therefore distracted from the content shown on display device 510. Individual 536 is viewing tablet 538 while the content is being displayed through display device 510. In addition to observing the person holding the tablet, signal data may be analyzed to understand what the person is doing on the tablet. For example, the person could be surfing the Web, checking e-mail, checking a social network site, or performing some other task. However, the individual 536 could also be viewing secondary content that is related to the primary content 411 shown on display device 510. What the person doing on tablet 538 may cause a different level of engagement to be associated with the person. For example, if the activity is totally unrelated (i.e., the activity is not secondary content), then the level of engagement mapped to the person's action (i.e., looking at the tablet) and associated with the person may be determined to be quite low. On the other hand, if the person is viewing secondary content that compliments the primary content 511, then the individual 536's action of looking at the tablet may be mapped to a somewhat higher level of engagement.

Individuals 532 and 534 are carrying on a conversation with each other but are not otherwise distracted because they are seated in front of the display device 510. If, however, audio input from individuals 532 and 534 indicate that they are speaking with each other while seated in front of the display device 510, their actions may be mapped to an intermediate level of engagement. Only individual 530 is viewing the primary content 511 and not otherwise distracted. Accordingly, a high level of engagement may be associated with individual 530 and/or the media content being displayed.

Determined distractions and levels of engagement of a person may additionally be associated with particular portions of image data, and thus, corresponding portions of media content. As mentioned elsewhere, such audience data may be stored locally on the game console 412 or communicated to a server for remote storage and distribution. The audience data may be stored as a viewing record for the media content. As well, the audience data may be stored in a user profile associated with the person for whom a level of engagement or distractions was determined.

Figure 6:
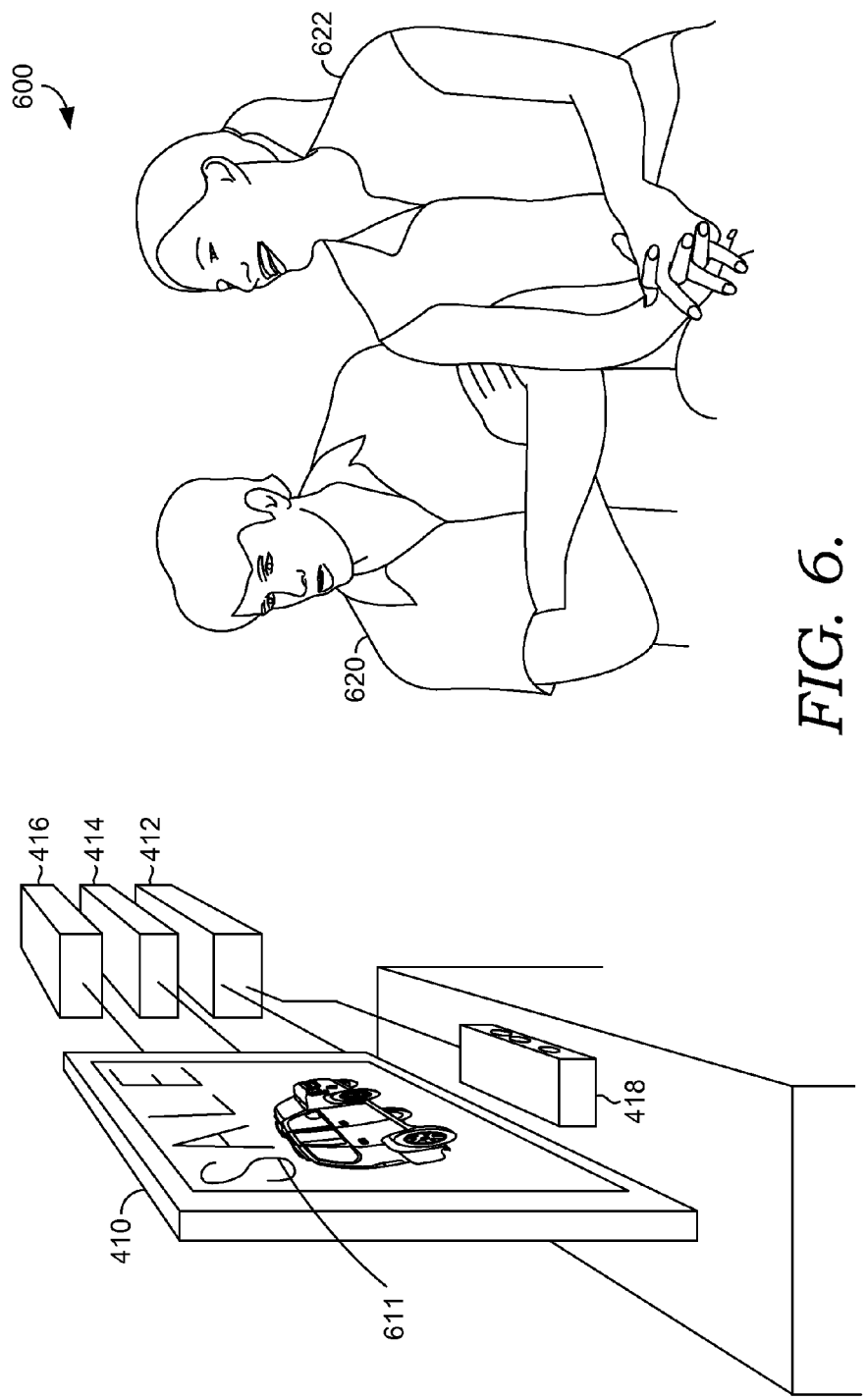
FIG. 6 is a diagram of an exemplary audience area captured using a depth camera, in accordance with an embodiment of the present invention.

Turning now to FIG. 6, a person's reaction to media content is classified and stored in association with the viewing data. The entertainment setup shown in FIG. 6 is the same as that shown in FIG. 4. However, the primary content 611 is different. In this case, the primary content is a car commercial indicating a sale. In addition to detecting that individuals 620 and 622 are viewing the content and are paying full attention to the content, the persons' responses to the car commercial may be measured through one or more methods and stored as audience data.

In one embodiment, a person's response may be gleaned from the images and/or audio originating from the person (e.g., the person's voice). Exemplary responses include smiling, frowning, wide eyes, glaring, yelling, speaking softly, laughing, crying, and the like. Other responses may include a change to a biometric reading, such as an increased or a decreased heart rate, facial flushing, or pupil dilation. Still other responses may include movement, or a lack thereof, for example, pacing, tapping, standing, sitting, darting one's eyes, fixing one's eyes, and the like. Each response may be mapped to one or more predetermined emotions, such as happiness, sadness, excitement, boredom, depression, calmness, fear, anger, confusion, disgust, and the like. For example, when a person frowns, her frown may be mapped to an emotion of dissatisfaction or displeasure. In embodiments, mapping a person's response to an emotion may additionally be based on the length of time the person held the response or the pronouncement of the person's response. As well, a person's response may be mapped to more than one emotion. For example, a person's response (e.g., smiling and jumping up and down) may indicate that the person is both happy and excited. Additionally, the predetermined categories of emotions may include tiers or spectrums of emotions. Baseline emotions of a person may also be taken into account when mapping a person's response to an emotion. For example, if the person rarely shows detectable emotions, a detected "happy" emotion for the person may be elevated to a higher "tier" of happiness, such as "elation." As well, the baseline may serve to inform determinations about the attentiveness of the person toward a particular media title.

In some embodiments, only responses and determined emotions that are responsive to the media content being displayed to the person are associated with the media content. Responsiveness may be related to a determined level of engagement of a person, as described above. Thus, responsiveness may be determined based on the direction the person is looking when a title is being displayed. For example, a person that is turned away from the display device is unlikely to be reacting to content being displayed on the display device. Responsiveness may similarly be determined based on the number and type of distractions located within the viewing area of the display device. Similarly, responsiveness may be based on an extent to which a person is interacting with or responding to distractions. For example, a person who is talking on the phone, even though facing and looking at a display screen of the display device, may be experiencing an emotion unrelated to the media content being displayed on the screen. As well, responsiveness may be determined based on whether a person is actively or has recently changed a media title that is being displayed (i.e., a person is more likely to be viewing content he or she just selected to view). It will be understood that responsiveness can be determined in any number of ways by utilizing machine-learning algorithms, and the examples provided herein are meant only to be illustrative.

Thus, returning to FIG. 6, the image data may be utilized to determine responses of individual 622 and individual 620 to the primary content 611. Individual 622 may be determined to have multiple responses to the car commercial, each of which may be mapped to the same or multiple emotions. For example, the individual 622 may be determined to be smiling, laughing, to be blinking normally, to be sitting, and the like. All of these reactions, alone and/or in combination, may lead to a determination that the individual 622 is pleased and happy. This is assumed to be a reaction to the primary content 611 and recorded in association with the display event. By contrast, individual 620 is not smiling, has lowered eyebrows, and is crossing his arms, indicating that the individual 620 may be angry or not pleased with the car commercial.

Figure 7:
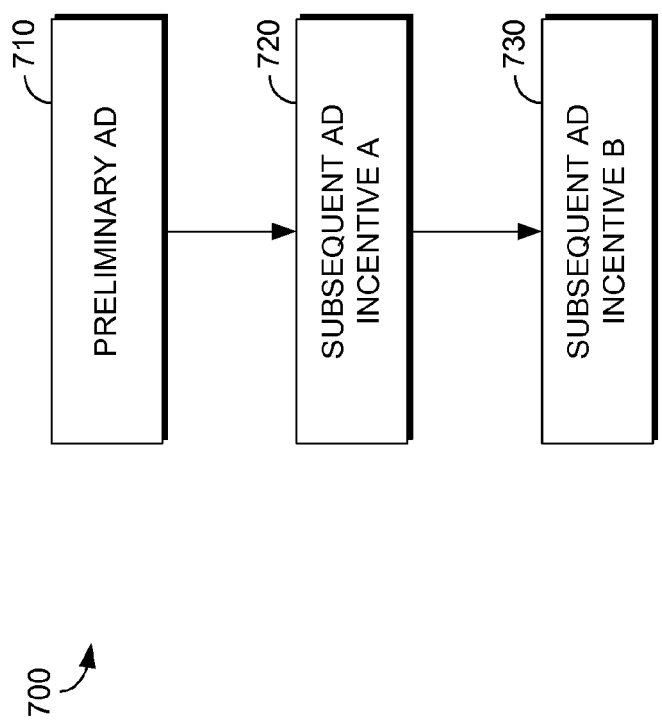
FIG. 7 is a diagram showing an ad path, in accordance with an embodiment of the present invention.

Turning now to FIG. 7, a linear ad path 700 is shown, in accordance with an embodiment of the present invention. The linear ad path 700 includes a preliminary ad 710, a subsequent ad 720 having incentive A, and a subsequent ad 730 having incentive B. Incentives A and B are different.

The preliminary ad 710 may be shown as part of a media presentation, such as product placement in a television show or an ad shown during a commercial break. The preliminary ad 710 is associated with one or more reaction criteria that are used to determine whether an audience member should be shown either of the subsequent ads. For example, the preliminary advertisement 710 may require that the user pays full attention to the preliminary ad to activate either subsequent ad. Using attentiveness as the reaction criteria may be used when the ads build on each other to tell a story, require knowledge of the previous ad in the path, or understand the new ad.

In another embodiment, the reaction criteria specifies that a positive response is detected or received from the audience member. An explicit response may be received while an implicit response is detected. Once the reaction criteria are satisfied, the subsequent ad 720 is activated for presentation to the user upon satisfaction of presentation triggers associated with the subsequent ad 720.

The subsequent ad 720 may be communicated to a device associated with the audience member. For example, the audience member may be associated through a user account with a personal computer, tablet, and smartphone. The subsequent ad 720 may be communicated to one or more devices that are capable of detecting context associated with the presentation trigger, including the device on which the preliminary ad 710 was viewed. For example, if the presentation trigger requires the user to be in a geographic area, then the subsequent ad 720 would only be communicated to devices that are location aware. On the other hand, if the presentation trigger associated with subsequent ad 720 only requires that it be shown to the user at a particular time, then it could also be sent to the personal computer, game console, or other nonlocation-aware entertainment devices.

The subsequent ad 720 may be shown to the user multiple times across multiple devices. In each case, the presentation and response, if any, may be communicated to a centralized ad tracking service. At some point, the user's response, or lack of response, to the subsequent ad 720 may cause the user to be shifted down the ad path 700 to subsequent ad 730 having incentive B. In one embodiment, the failure of the user to respond to subsequent ad 720 with incentive A causes the user to be shifted down the path 700 to subsequent ad 730 with incentive B, which is higher than incentive A. In other situations, incentive A and incentive B are not of a significantly different value, but are just different. For example, incentive A could be for the user to get a free soft drink, while incentive B is for the user to get a free cup of coffee.

In one embodiment, the user's positive response to subsequent ad 720 causes the user to be shifted to subsequent ad 730. For example, upon detecting that the user purchased a first product in response to subsequent ad 720, a related product could be advertised through subsequent ad 730. In this case, incentives A and B would be directed toward different products associated with their corresponding advertisements. For example, having purchased movie tickets through subsequent ad 720, subsequent ad 730, having a coupon for popcorn, could be displayed upon the user arriving at the theater.

Figure 8:
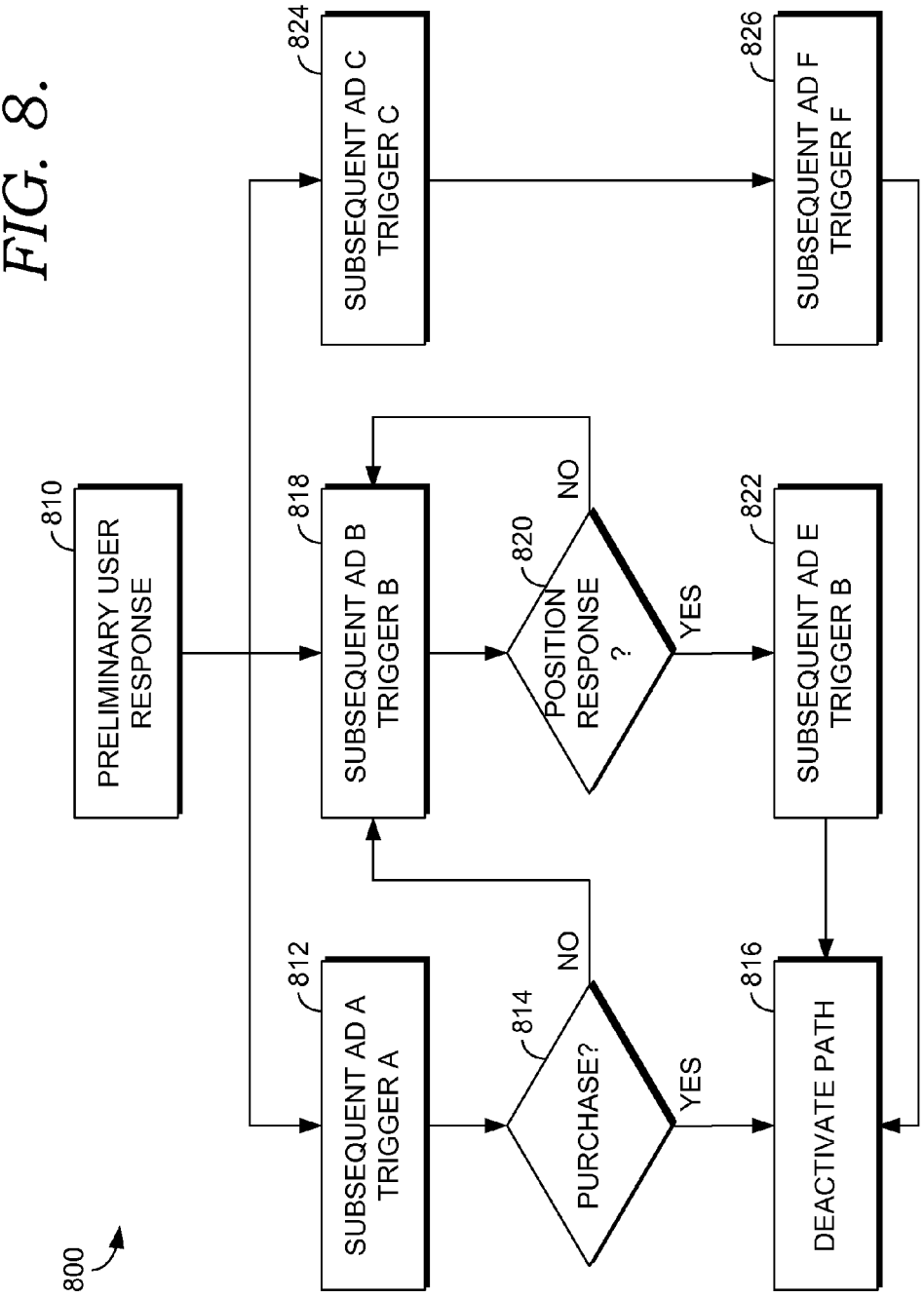
FIG. 8 is a diagram showing an ad path, in accordance with an embodiment of the present invention.

Turning now to FIG. 8, a nonlinear ad path 800 is shown, in accordance with an embodiment of a present invention. The ad path 800 starts with a preliminary user response 810 to content, such as preliminary ad. Different subsequent ads within the ad path 800 may be activated in response to the preliminary user response 810. The preliminary user response 810 may be explicit or implicit. The preliminary user response 810 may be in response to an advertisement, but could also be in response to nonadvertising content.

For example, the user could respond positively to a baseball game (nonadvertising content) between two teams. Upon determining that the user is associated with a city where one of the teams is based, the user could be placed into an ad path designed to incentivize the user to purchase goods or services associated with the baseball team. For example, subsequent ad A 812, having presentation trigger A could be related to the user purchasing tickets for a baseball game. At decision point 814, the user's response to subsequent ad A 812 is evaluated. Upon determining that the user purchased baseball tickets, the path may be deactivated at step 816. The user's purchase record may be updated indicating that the user purchased baseball tickets.

Upon determining that the user did not purchase baseball tickets in response to subsequent ad A 812, the user may be moved to a different part in the path 800 associated with subsequent ad B 818. As can be seen, ad 818 is associated with a different trigger and could also be associated with different incentives. The response to subsequent ad B 818 is monitored at decision point 820. Upon determining that a positive response has not been received, the ad B 818 may remain active for subsequent presentation when trigger B is satisfied the next time. If a positive response is noted at decision point 820, the user could be moved to a different part in the path associated with subsequent ad E 822. Notice that subsequent ad B 818 and subsequent ad E 822 are both associated with trigger B. Ads within an advertising path and across different advertising paths may use the same triggers. For example, trigger B could be associated with a time frame before an upcoming baseball home stand. The subsequent ad E 822 could be associated with a different home stand or games that received the positive response to subsequent ad B 818. Though not shown, the various points along the path could loop or be deactivated in response to a positive response or purchase.

In one embodiment, the part of the path showing subsequent ad C 824 and subsequent ad F 826 are related to a complimentary product, such as a baseball jersey or cap. Thus, while the part of the path associated with subsequent ads 812, 818, and 822 are all attempting to sell baseball tickets, the complimentary products may be part of a related subsequent path with different triggers and incentives. For example, the trigger C that is part of subsequent ad C 824 may be related to geographic proximity with a retail outlet where baseball caps are sold.

The user could be associated with multiple subsequent ads within the ad path 800 at the same time when appropriate. For example, the user could be associated with a subsequent ad offering baseball tickets at the same time she is associated with a subsequent ad selling baseball caps. Similarly, the user could be associated with multiple subsequent ads offering the same thing but with different triggers. For example, the triggers could specify different geographic locations associated with different retail stores and different incentives offered by those respective stores.

Figure 9:
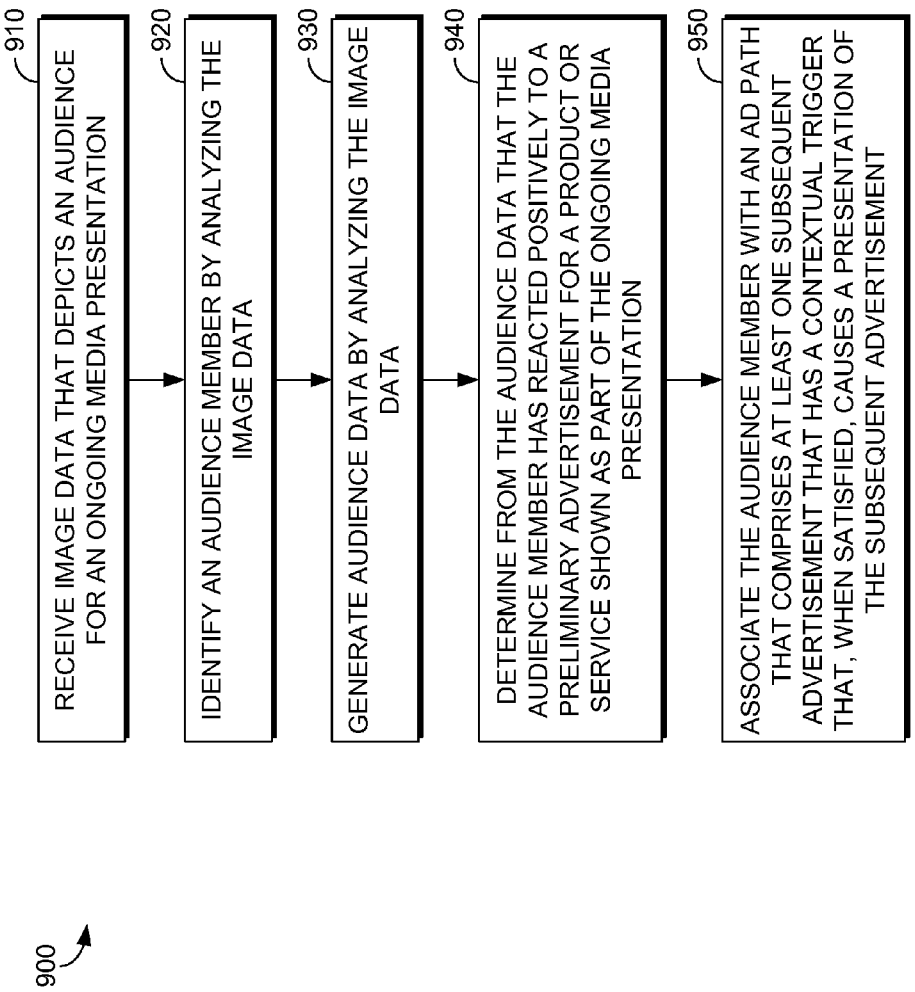
FIG. 9 is a flow chart showing a method of providing linked advertisements, in accordance with an embodiment of the present invention.

Turning now to FIG. 9, a method 900 of providing linked advertisements is shown, in accordance with an embodiment of the present invention. The method may be performed on a game console or other entertainment device that is connected to an imaging device with a view of an audience area approximate to a display device.

At Step 910, image data that depicts an audience for an ongoing media presentation is received. The image data may be in the form of a depth cloud generated by a depth camera, a video stream, still images, skeletal tracking information or other information derived from the image data. The ongoing media presentation may be a movie, game, television show, an advertisement, or the like. Ads shown during breaks in a television show may be considered part of the ongoing media presentation.

The audience may include one or more individuals within an audience area. The audience area includes the extents from which the ongoing media presentation may be viewed from the display device. The individuals within the audience area may be described as audience members herein.

At step 920, an audience member is identified by analyzing the image data. In one embodiment, the audience member is identified through facial recognition. For example, the audience member may be associated with a user account that provides facial recognition authentication or login. The audience member's account may then be associated with one or more social networks. In one embodiment, social networks are associated with a facial recognition login feature that allows the audience member to be associated with a social network.

The audience member may be given an opportunity to explicitly associate his account with one or more social networks. The audience member may be a member of more social networks than are actually associated with the account. But embodiments of the present invention may work with whatever social networks the audience member has provided access to. Upon determining that the audience member is associated with a social network, the audience member may be asked to provide authentication information or permission to access the social network. This information may be requested through a setup overlay or screen. The setup may occur at a point separate from when the media presentation is ongoing, for example, when an entertainment device is set up.

At Step 930, audience data is generated by analyzing the image data. Exemplary audience data has been described previously. The audience data may include a number of people that are present within the audience. For example, the audience data could indicate that five people are present within the audience area. The audience data may also associate audience members with demographic characteristics.

The audience data may also indicate an audience member's level of attentiveness to the ongoing media presentation. Different audience members may be associated with a different level of attentiveness. In one embodiment, the attentiveness is measured using distractions detected within the image data. In other words, a member's interactions with objects other than the display may be interpreted as the member paying less than full attention to the ongoing media presentation. For example, if the audience member is interacting with a different media presentation (e.g., reading a book, playing a game) then less than full attentiveness is paid to the ongoing media presentation. Interactions with other audience members may indicate a low level of attentiveness. Two audience members having a conversation may be assigned less than a full attentiveness level. Similarly, an individual speaking on a phone may be assigned less than full attention.

In addition to measuring distractions, an individual's actions in relation to the ongoing media presentation may be analyzed to determine a level of attentiveness. For example, the user's gaze may be analyzed to determine whether the audience member is looking at the display. When multiple content items are shown within the ongoing media presentation, such as an overlay over a primary content, gaze detection may be used to determine whether the user is ignoring the overlay and looking at the ongoing media presentation or is focused on the overlay, or even noticed the overlay for a short period. Thus, attentiveness information could be assigned to different content shown on a single display.

The audience data may also measure a user's reaction or response to the ongoing media presentation. As mentioned previously with reference to FIG. 6, a user's response or reaction may be measured based on biometric data and facial expressions.

At step 940, the audience member is determined to have reacted positively to a preliminary advertisement for a product or service shown as part of the ongoing media presentation. The preliminary advertisement could be a commercial shown during a break in the primary content, including before presentation of the primary content begins or after it concludes. The preliminary advertisement could also be product placement within primary media content. The preliminary advertisement could be an overlay. The overlay could be shown concurrently with the primary content.

The audience member's positive reaction is determined using the audience data generated previously at step 930. In one embodiment, reactions within the audience data are correlated to content within the ongoing media presentation. For example, a positive response observed at the same time a sports car appears within the media content may trigger a subsequent ad for the sports car. The sports car may be part of a product placement.

In one embodiment, each reaction within the audience data is associated with a time and can be used to associate the reaction with a particular point in the content. For example, if the presentation starts at noon and a reaction is observed within the audience data at 1:00 p.m., then the reaction may be associated with content shown one hour into the ongoing media presentation. Other ways to correlate a reaction with a point within the media presentation are possible. In one embodiment, metadata is associated with the ongoing media presentation to identify content displayed at various progress points. One example of content is a preliminary advertisement. A preliminary advertisement may be a television commercial, product placement, an overlay, or the like.

The preliminary advertisement is associated with a response or reaction threshold. When a reaction within the audience data is correlated to the preliminary advertisement and determined to satisfy the reaction threshold, then a subsequent advertisement may be activated. A subsequent advertisement may be thought of as a follow-up to the preliminary advertisement. In one embodiment, the preliminary advertisement and subsequent advertisement could be the same. However, the subsequent advertisement is associated with one or more presentation triggers. The subsequent ad is only displayed when the presentation trigger criteria are satisfied. The presentation criteria may be context based. For example, the subsequent advertisement may be shown on a mobile device associated with the audience member at a time and place that is conducive to purchasing an advertised product or service.

At step 950, the audience member is associated with an ad path that comprises at least one subsequent advertisement that has a presentation trigger that when satisfied causes a presentation of the subsequent advertisement. Examples of ad paths have been described previously. The user could be associated with a particular subsequent advertisement within the ad path that includes multiple subsequent advertisements. In one embodiment, the strength of the user reaction is determined or is used to determine which subsequent advertisement within the path should be activated. An activated subsequent advertisement is actively monitored for satisfaction of the presentation trigger associated with the subsequent advertisement. Dormant or inactive subsequent advertisements within the path are not monitored and are not triggered for display until activated. A user's response to a first subsequent advertisement, either positive or negative, could cause an additional subsequent advertisement to be activated and the initial subsequent active advertisement to be inactivated.

In one embodiment, the audience member is associated with a user account. The user account may be for an entertainment service, e-mail, a social network, or other service that is accessed through multiple devices. The subsequent advertisements may be presented through this service or through an application associated with this service. In this way, subsequent advertisements may be presented on one or more devices associated with the user. Accordingly, the ad path may be communicated to multiple devices associated with the user. Different subsequent advertisements could be activated on different devices. For example, a subsequent advertisement associated with a particular time and location could be active on the mobile device associated with the audience member, whereas a different subsequent advertisement could be activated on a game console or other mostly stationary device. In one embodiment, the subsequent advertisement on the mobile device is obtrusive. The subsequent advertisement may be associated with a vibration, noise, or other indication to get the user's attention.

Figure 10:
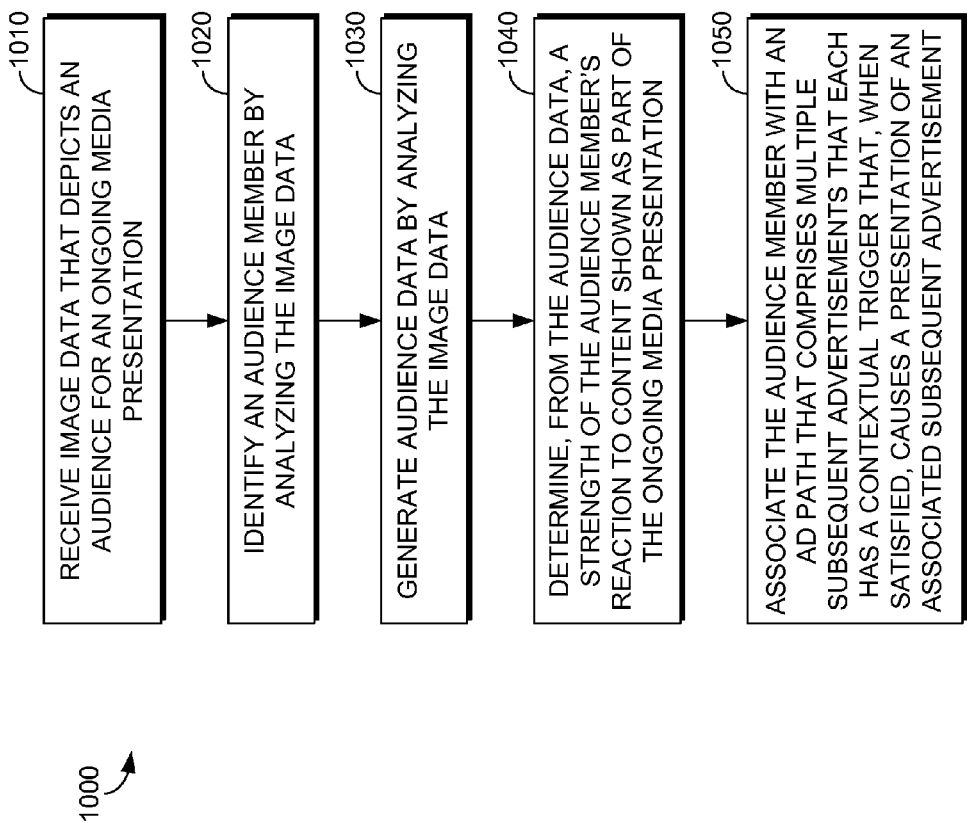
FIG. 10 is a flow chart showing a method of assigning an audience member to an ad path, in accordance with an embodiment of the present invention.

Turning now to FIG. 10, a method 1000 of assigning an audience member to an ad path is shown, in accordance with an embodiment of the present invention. At step 1010, image data that depicts an audience for the ongoing media presentation is received. At step 1020, an audience member is identified by analyzing the image data. For example, the audience member could be identified using voice recognition or facial recognition. At step 1030, audience data is generated by analyzing the image data. The audience data may classify the reactions of individuals present within the audience. The individuals may be alternatively described as users or audience members.

At step 1040, a strength of the audience member's reaction to content shown as part of the ongoing media presentation is determined from the audience data. The strength of the reaction is intended to capture a user's enthusiasm for a content, such as a preliminary advertisement. The strength of the advertisement may be determined based on an audience member profile that tracks a range of responses made by the audience member. For example, a raised eyebrow may be an extremely positive strong response from a first audience member and only a mildly positive response or even a skeptical response from a different audience member. Some individuals are more expressive than others and the user account and profile is able to adjust for these differences by comparing the reactions of an individual over time. Feedback from an advertising path may be provided to further refine the responses of an individual. For example, if a particular reaction is initially interpreted as positive, but the user never responds positively to the advertisements, then the expression may be reclassified.

At step 1050, the audience member is associated with an ad path that comprises multiple subsequent advertisements that each has a presentation trigger that, when satisfied, causes a presentation of an associated subsequent advertisement. An ad path having multiple subsequent advertisements has been described previously with reference to FIG. 8. In one embodiment, the ad path, including the subsequent advertisements and associated presentation triggers, are communicated to multiple devices associated with the audience member. For example, the communication or the ad path could be communicated to the audience member's smartphone and tablet. The communications between devices could be coordinated through a central advertising component associated with an advertising service or entertainment service. The centralized ad service may generate different ad paths and communicate them to different devices. The centralized ad service may also download initial triggers to entertainment devices that cause the user to be associated with a certain ad path.

In another embodiment, audience data is communicated from an entertainment device to a centralized ad component that analyzes the audience data and associates the user with an ad path when various criteria are satisfied. In an alternative embodiment, the criteria are communicated to an entertainment device that makes the comparison.

Figure 11:
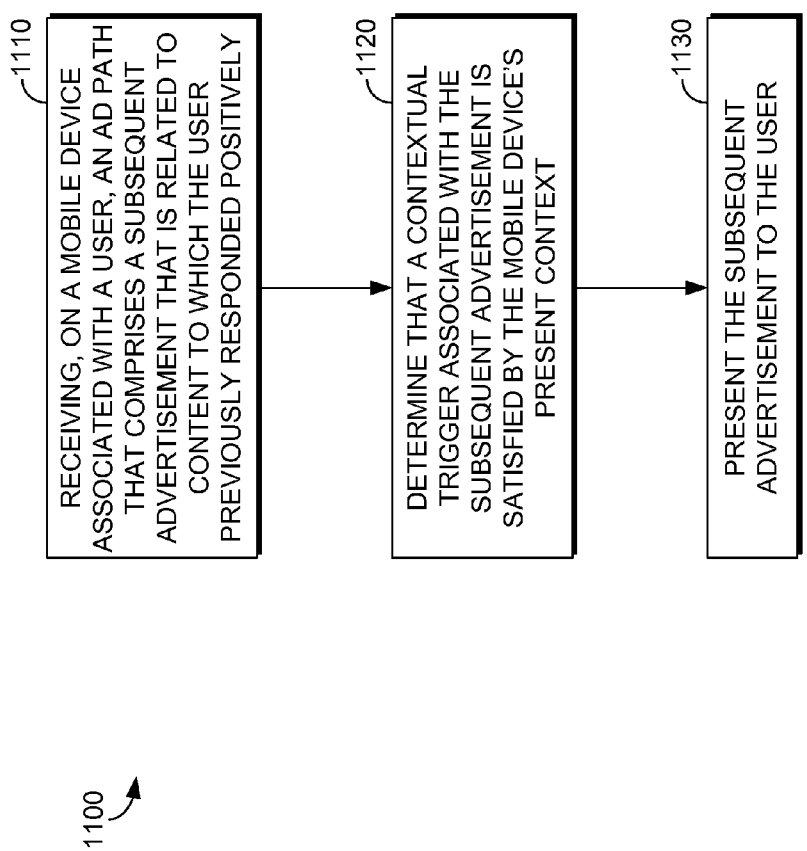
FIG. 11 is a flow chart showing a method of managing an ad path, in accordance with an embodiment of the present invention.

Turning now to FIG. 11, a method 1100 of managing an ad path is shown, in accordance with an embodiment of the present invention. Method 1100 may be performed by a mobile device such as a smartphone or a tablet. In one embodiment, the mobile device is location-aware through GPS technology, or other location technology.

At step 1110, an ad path that comprises a subsequent advertisement that is related to content to which the user previously responded positively is received on a mobile device associated with a user. The subsequent advertisement could have been shown on a different device such as a television or on the mobile device.

At step 1120, determining that a presentation trigger associated with the subsequent advertisement is determined to be satisfied by the mobile device's present context. The context could include a time, location, and user activity. An example of a user activity includes driving, riding a bus, and riding a train. In each case, the user context for time and location could be satisfied, but the user may only be shown the advertisement if driving. This may make sense because the user may not be able to get off a train or a bus in time to respond to the suggestion made within the subsequent advertisement. For example, the subsequent advertisement could provide a coupon for coffee as the user approaches a coffee shop. If the user was determined to be on a bus, for example, by observing a pattern of starting and stopping at known bus stops, then the user may not be shown the advertisement unless a bus stop is near the coffee shop. All of this would be taken into account by the presentation triggers.

At step 1130, the subsequent advertisement is presented to the user. In one embodiment, the user's response to the subsequent advertisement is monitored. A positive or negative response may be communicated to a central ad component that handles billing and may provide additional instructions regarding the next steps with regard to the ad path. In one embodiment, a different subsequent advertisement within the ad path is activated upon detecting a positive or a negative response. The present subsequent advertisement may be simultaneously deactivated.

Embodiments of the invention have been described to be illustrative rather than restrictive. It will be understood that certain features and subcombinations are of utility and may be employed without reference to other features and subcombinations. This is contemplated by and is within the scope of the claims.

The invention claimed is:

1. One or more computer-storage device having computer-executable instructions embodied thereon that when executed by a computing device perform a method of providing linked advertisements, the method comprising:
   receiving image data that depicts an audience for an ongoing media presentation;
   identifying an audience member by analyzing the image data;
   generating audience data by analyzing the image data;
   determining from the audience data that the audience member has reacted positively to a preliminary advertisement for a product or service shown as part of the ongoing media presentation;
   in response to said determining, associating the audience member with an ad path that comprises a subsequent advertisement that has a presentation trigger that, when satisfied, causes a presentation of the subsequent advertisement,
   monitoring the user's response to the subsequent advertisement, activating a different subsequent advertisement in the ad path based on the user's response, and monitoring conditions to determine when the presentation trigger associated with the different subsequent advertisement is satisfied, and
   wherein the user's response is negative and the different subsequent advertisement comprises a larger incentive for the user to purchase an advertised good or service.

2. The device of claim 1, wherein the method further comprises determining an audience member's reaction to the preliminary advertisement is positive by analyzing the image data and including the audience member's reaction in the audience data.

3. The device of claim 1, wherein the method further comprises associating the audience member with a user account and associating the audience member with a mobile device through the user account.

4. The device of claim 3, wherein the method further comprises determining that the presentation trigger has been satisfied using data generated by the mobile device and presenting the subsequent advertisement to the audience member.

5. The device of claim 4, wherein the method further comprises presenting the subsequent advertisement through the mobile device.

6. The device of claim 1, wherein the presentation trigger is satisfied when the audience member is near a retail outlet where the product or service is sold.

7. The device of claim 1, wherein determining that the audience member has reacted positively to the preliminary advertisement comprises recognizing an affirmative gesture performed by the audience member.

8. The device of claim 1, wherein the method further comprises determining demographic information for the audience member by analyzing the image data and including the demographic information within the audience data.

9. A method of assigning an audience member to an ad path, the method comprising:
   receiving image data that depicts an audience for an ongoing media presentation;
   identifying the audience member by analyzing the image data;
   generating audience data by analyzing the image data;
   determining, from the audience data, a strength of the audience member's reaction to content shown as part of the ongoing media presentation;
   in response to said determining, associating the audience member with an ad path that comprises multiple subsequent advertisements that each has a presentation trigger that, when satisfied, causes a presentation of an associated subsequent advertisement,
   wherein the ad path comprises a high-enthusiasm subsequent advertisement that is associated with a lower-level incentive and a low-enthusiasm subsequent advertisement that is associated with a higher-level incentive; and
   assigning the audience member to the high-enthusiasm subsequent advertisement when the strength of the audience member's reaction is strongly positive and the low-enthusiasm subsequent advertisement when the strength of the audience member's reaction is weakly positive.

10. The method of claim 9, wherein the audience member is identified through facial recognition using the image data.

11. The method of claim 9, wherein the strength of the audience member's reaction is determined using a reaction profile for the audience member that includes a range or reactions observed in the audience member.

12. The method of claim 9, wherein the content is not an advertisement.

13. One or more computer-storage device having computer-executable instructions embodied thereon that when executed by a computing device perform a method of managing an ad path, the method comprising:
   receiving, on a mobile device associated with a user, an ad path that comprises a subsequent advertisement that is related to content to which the user previously responded positively;
   determining that a presentation trigger associated with the subsequent advertisement is satisfied by the mobile device's present context;
   presenting the subsequent advertisement to the user,
   monitoring the user's response to the subsequent advertisement, activating a different subsequent advertisement in the ad path based on the user's response, and monitoring conditions to determine when the presentation trigger associated with the different subsequent advertisement is satisfied, and
   wherein the user's response is negative and the different subsequent advertisement comprises a larger incentive for the user to purchase an advertised good or service.

14. The device of claim 13, wherein the user responded positively by performing a gesture.

15. The device of claim 13, wherein the ad path comprises multiple subsequent ads that are individually activated based on different user responses to one or more of the multiple subsequent ads.

16. The device of claim 13, wherein the presentation trigger comprises the mobile device being located in a geographic area.

* * * * *